Dec. 31, 1963 R. T. TOWNSEND 3,115,668
MACHINE FOR ENCASING SAUSAGE AND THE LIKE
Filed May 14, 1962 6 Sheets-Sheet 1
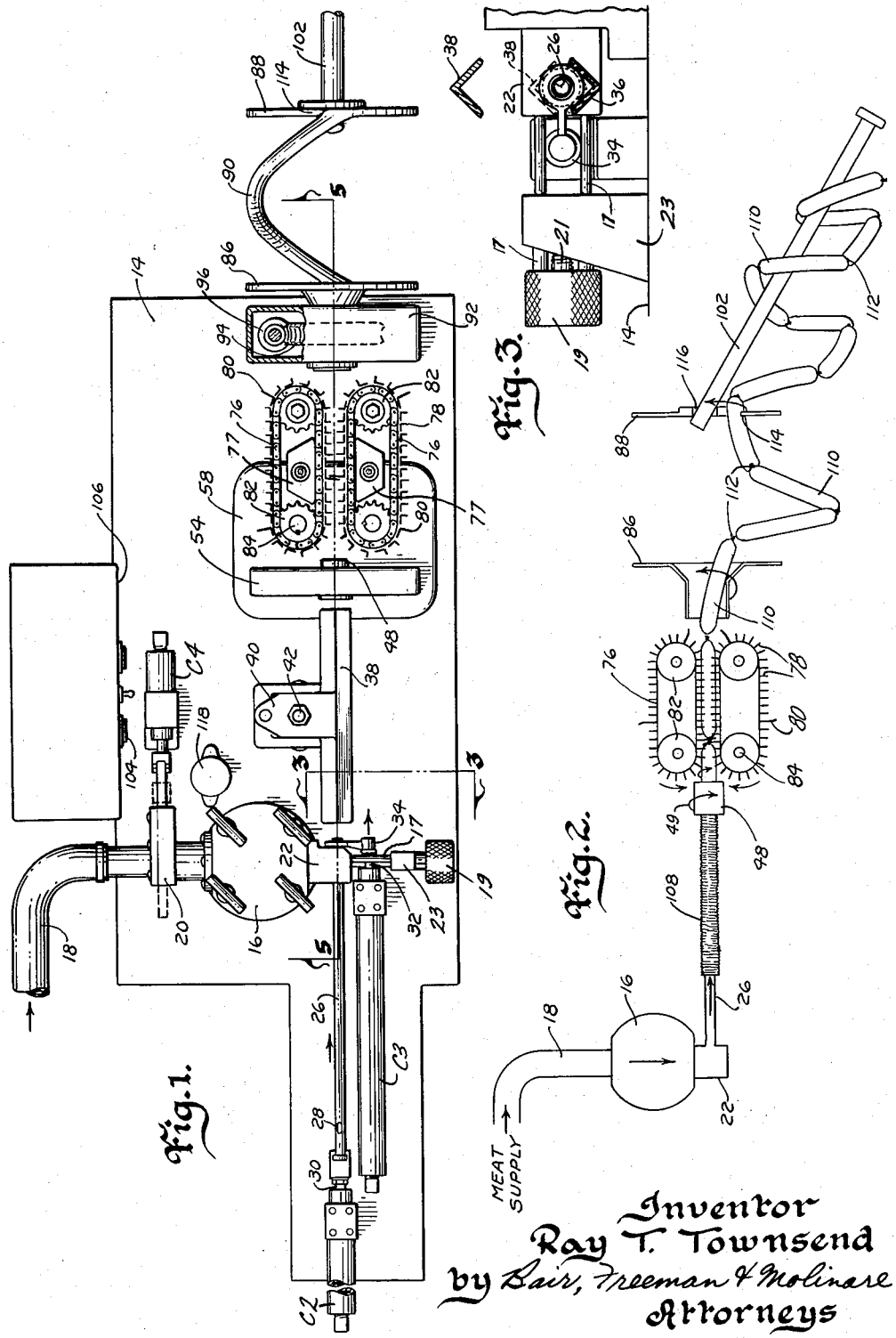
Inventor
Ray T. Townsend
by Bair, Freeman & Molinare
Attorneys Dec. 31, 1963  R. T. TOWNSEND  3,115,668
MACHINE FOR ENCASING SAUSAGE AND THE LIKE
Filed May 14, 1962  6 Sheets-Sheet 2
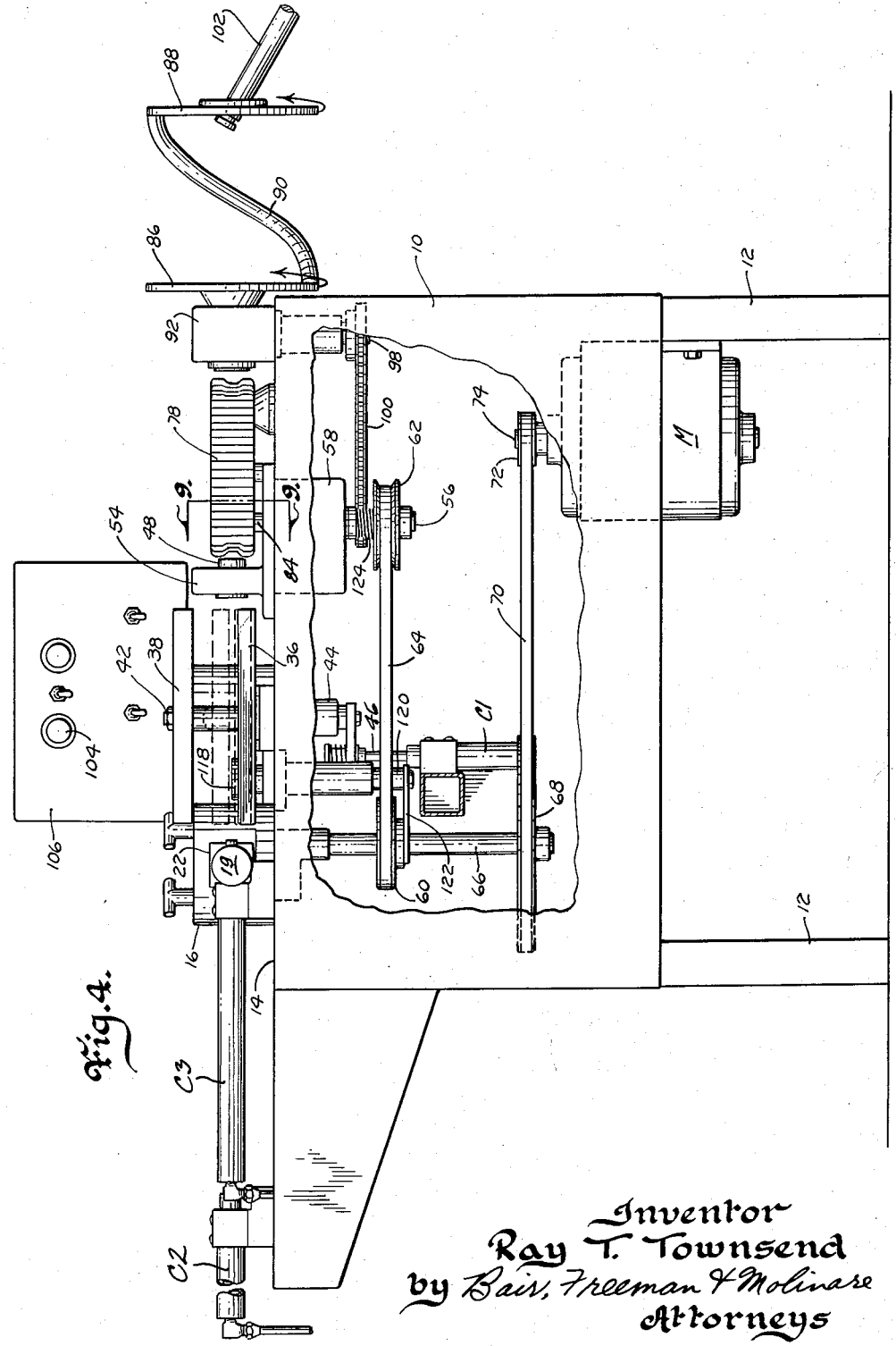

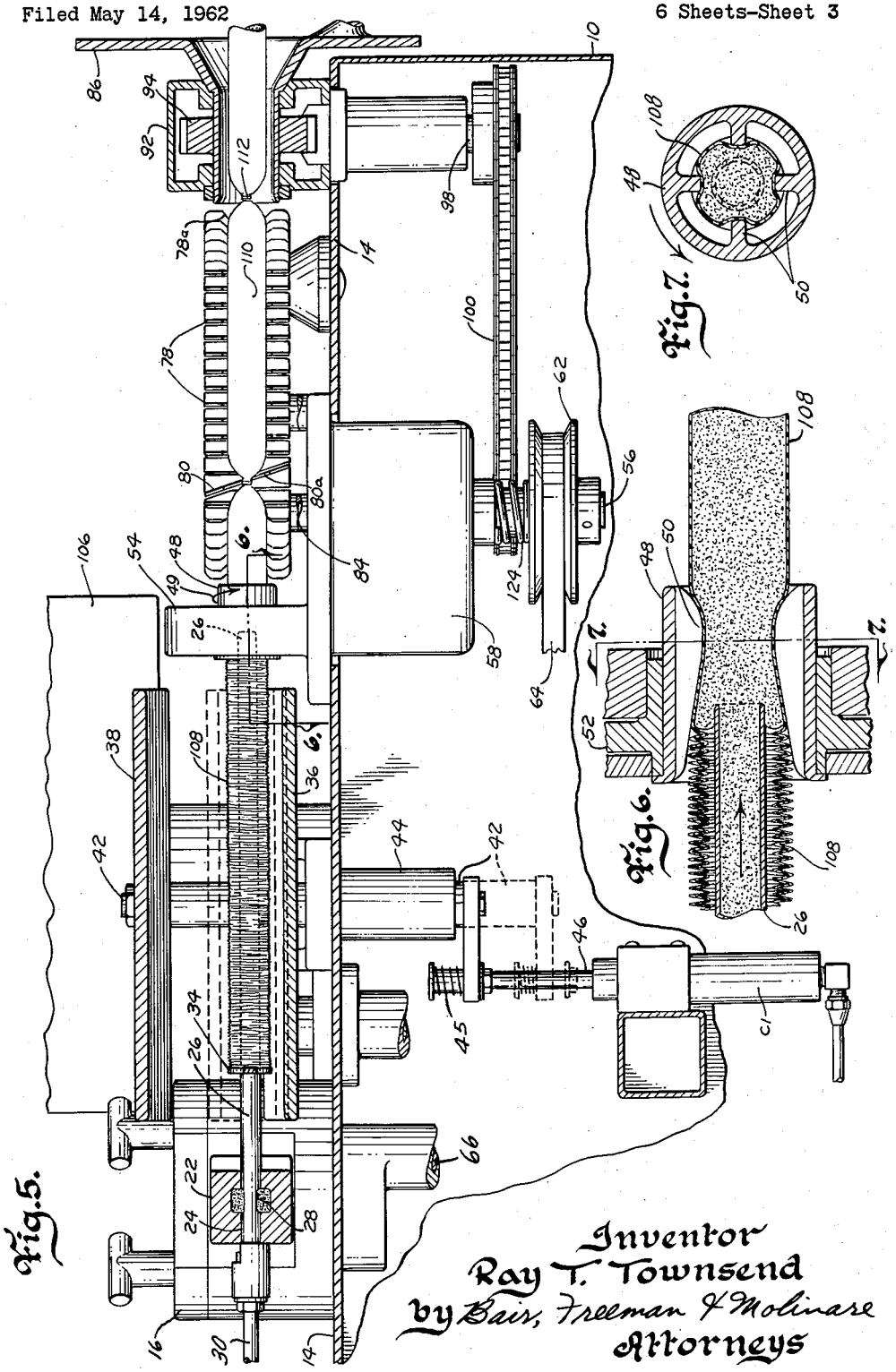

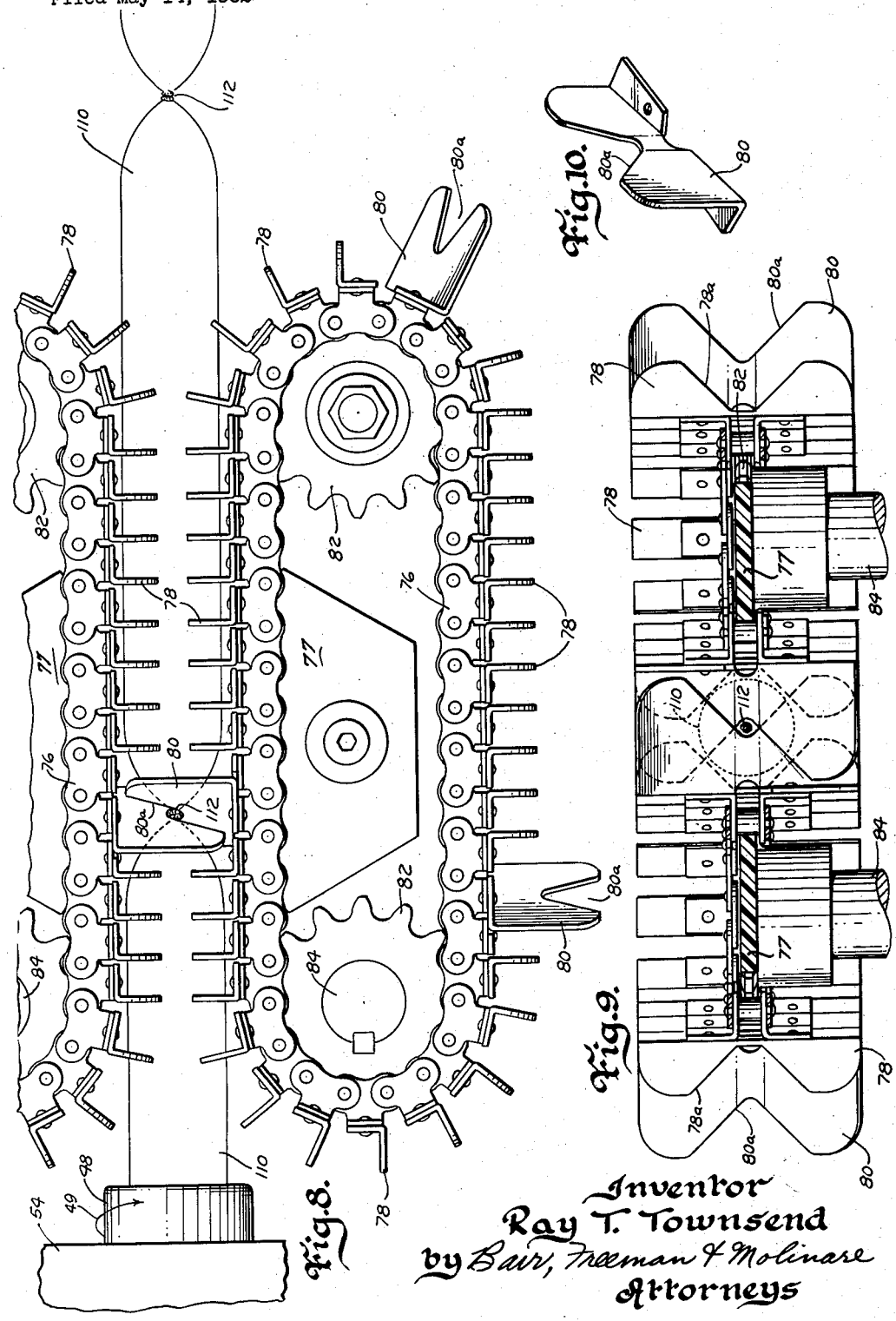

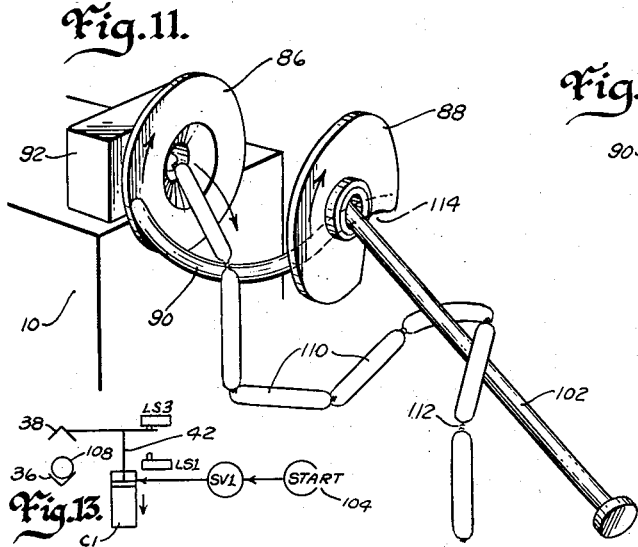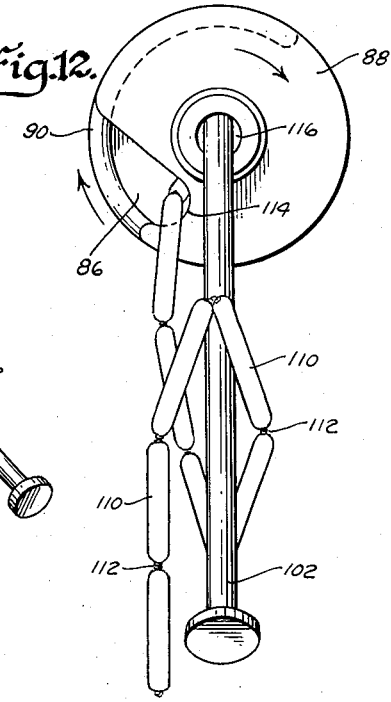

Dec. 31, 1963     R. T. TOWNSEND     3,115,668
MACHINE FOR ENCASING SAUSAGE AND THE LIKE
Filed May 14, 1962     6 Sheets-Sheet 6
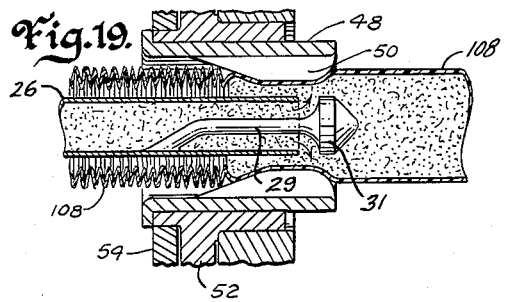
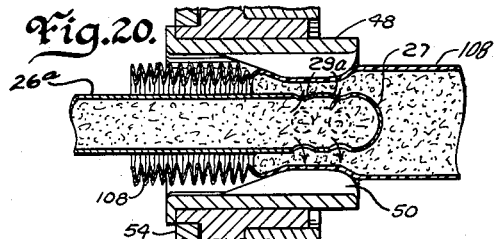
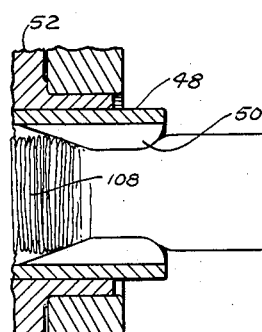
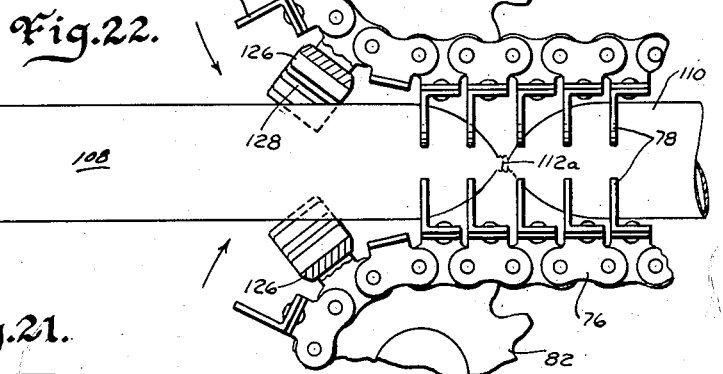
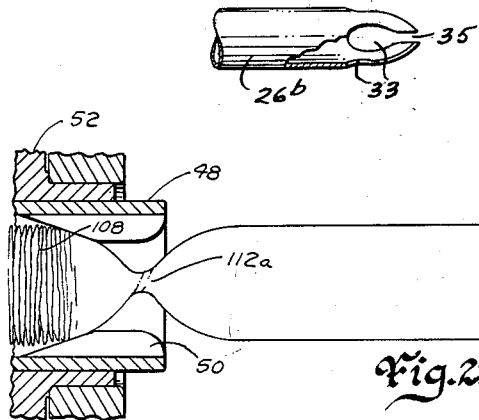
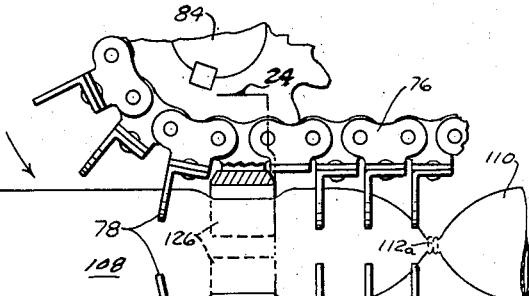
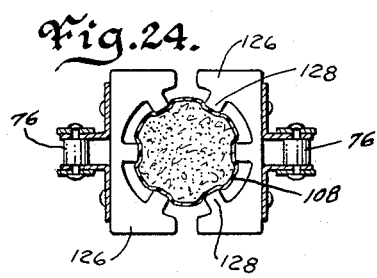
Inventor
Ray T. Townsend
by Bair, Freeman & Molinare
Attorneys 3,115,668
MACHINE FOR ENCASING SAUSAGE
AND THE LIKE
Ray Theodore Townsend, Des Moines, Iowa, assignor to
Townsend Engineering Company, Des Moines, Iowa, a
corporation of Iowa
Filed May 14, 1962, Ser. No. 194,523
19 Claims. (Cl. 17—33)

This invention relates to a machine for encasing product such as sausage and the like, the machine being automatically operable through a complete cycle for encasing a relatively long length of the product, linking the same, and looping the links on a smoke stick or the like.

One object of the invention is to provide a relatively simple machine which, after encasing the product, divides the casing into links of accurately controlled diameter and length, and therefore weight, such as impossible of attainment with linking machines to which encased sausage or the like is supplied from a manually controlled casing filling machine.

Another object is to provide linking mechanism comprising a rotating chuck through which the encased product is forced, whereby the chuck rotates the casing, means being provided to control the diameter of the casing and periodically separate it into links in such manner as to prevent rotation of the links after they are formed.

Still another object is to provide a simple link looper in the form of a pair of discs which are rotatably mounted and connected together by a helical rod, the links being fed through the center of one disc and engaged by the helical rod and a notch in the other disc for determining the number of links in the loop, and looping the links in such manner that they are then transferred in loop formation onto a smoke stick or the like preparatory to being racked up on frames for smoking and/or cooking the product.

A further object is to provide a metering pump for the material fed to the casing and to regulate the speed of the linking mechanism in relation thereto so as to adjust and accurately control the quantity of product, and the length of each link and thereby the weight of the link.

Still a further object is to provide means for automatically operating the machine through a complete cycle after a casing is positioned therein and a start button depressed, the machine automatically stopping in position for the next casing after the first casing has been completely filled, linked and looped.

An additional object is to provide a machine in which there is a continuous unidirectional flow of product into the casing, and of filled casing through the machine without starting and stopping, the linking of the casing being done "on the fly."

Another additional object is to provide, in general, a machine for processing sausages or frankfurters and the like in a continuous manner once the machine starts whereupon the machine passes through a complete cycle and while doing so the operator may proceed to another similar machine, start it in operation, and be able to load several machines with casings whereupon they continue to operate automatically until their cycles are completed thus effecting considerable production of filled, linked and looped sausages or frankfurters from one operator.

With these and other objects in view, my invention consists in the construction, arrangement and combination of the various parts of my machine for encasing sausage and the like, whereby the objects above contemplated are attained, as hereinafter more fully set forth, pointed out in my claims and illustrated in detail on the accompanying drawings, wherein:

FIG. 1 is a plan veiw of a machine for encasing sausage and the like embodying my invention.

FIG. 2 is a diagrammatic view thereof to illustrate the complete operation of the machine.

FIG. 3 is a vertical sectional view on the line 3—3 of FIG. 1 showing constructional details on an enlarged scale.

FIG. 4 is a front elevation of FIG. 1, part of a housing being broken away to show internal details.

FIG. 5 is an enlargement, partly in section on the line 5—5 of FIG. 1, to show details.

FIG. 6 is an enlarged sectional view on the line 6—6 of FIG. 5 to show constructional details of a casing chuck.

FIG. 7 is a sectional view on the line 7—7 of FIG. 6 to show the coaction of the casing chuck with a meat mixture casing.

FIG. 8 is an enlargement of a portion of FIG. 1 showing a linking mechanism which cooperates with the casing chuck in linking a filled casing.

FIG. 9 is an enlarged vertical sectional view thereof as taken on the line 9—9 of FIG. 4.

FIG. 10 is a perspective view of a crimping lug used in a linking chain of the linking mechanism.

FIG. 11 is a perspective view of a link looper showing it in operation.

FIG. 12 is an end view thereof.

FIG. 13 is an operational diagram showing a casing clamp open and receiving a casing at the start of an automatic cycle of operation for the machine.

FIG. 14 is an operational diagram showing a casing clamp closed and initiating movement of the stuffer tube.

FIG. 15 is an operational diagram showing the stuffer tube completely in the casing and effecting opening of the casing clamp.

FIG. 16 is an operational diagram showing the beginning of the operation of a casing follower and the commencement of meat pumping.

FIG. 16a is an operational diagram showing a modification with respect to a portion of FIG. 16.

FIG. 17a is a similar operational diagram showing the parts in a different position.

FIG. 17 is an operational diagram showing the completion of a filled casing which results in the casing follower effecting its own retraction and stoppage of the meat pumping operation.

FIG. 18 is an operational diagram showing the completion of the cycle of operation wherein the stuffer tube is retracted in response to full retraction of the casing follower.

FIG. 19 is a sectional view simliar to FIG. 6 showing a casing chuck and the discharge end of a modified form of stuffer tube.

FIG. 20 is a similar view showing the discharge end of another modified form of stuffer tube.

FIG. 21 is a side elevation, partly broken away, of still another modified form of stuffer tube discharge end.

FIG. 22 is a view similar to a portion of FIG. 8 showing a modified form of casing linking mechanism with the parts in one position just prior to forming a new link.

FIG. 23 is a similar view showing the parts in a different position just after the beginning of the formation of the new link, and FIG. 24 is a sectional view on the line 4—4 of FIG. 23.

On the accompanying drawings I have used the reference numeral 10 to indicate a housing supported by legs 12. The housing 10 is provided with a top 14.

Mounted on the top 14 is a meat mixture pump 16 to which a meat mixture conduit 18 extends, being interrupted by a meat mixture valve 20. The valve 20 is closed and opened by an air cylinder C4 operatively connected therewith. An outlet housing 22 is held in contact with the pump 16 by means of pressure pins 17 and a knob 19 on a screw 21 that screws into a stationary bracket 23. This arrangement facilitates removal of the housing 22 for cleaning purposes. The housing has a bore 24 slidably receiving a stuffer tube 26. The stuffer tube has ports 28 therein adjacent its left hand end and is connected with a piston rod 30 extending into a cylinder C2 and provided therein with a piston in the usual manner so that the piston can be reciprocated pneumatically relative to the cylinder and in turn will reciprocate the stuffer tube 26.

A second cylinder C3 is provided as shown in FIG. 1 from which a piston rod 32 extends and on which a casing follower 34 is mounted. The follower is perforated to receive, and is slidable on, the stuffer tube 26.

Aligned with the stuffer tube 26 is a casing clamp for a meat mixture receiving casing 108. This clamp comprises a lower V-seat 36 and an upper V-seat 38, the lower seat being stationary as shown in FIG. 3 and the upper seat movable between the dotted position and the full line position illustrated. To accomplish such movement the upper seat 38 has a lateral extension 40 secured to a vertical slide rod 42 adapted to slide in a bearing 44 as shown in FIG. 5 and operatively connected with a piston rod 46 extending into an actuating cylinder C1. A spring 45 is provided to impose resilient pressure when the clamp is closed (dotted positions in FIGS. 4 and 5).

At the right hand end of the casing clamp 36—38 I provide a casing chuck 48 in the form of a rotatable tube having inwardly extending flutes 50 as shown in FIGS. 6 and 7. The casing chuck 48 is carried by a gear 52 which serves to rotate it, the gear being journaled in a housing 54 and operatively conected to a vertical shaft 56 by suitable gearing in gear housing 58. A shaft 56 is driven by variable diameter pulleys 60 and 62 and a belt 64 from a pump shaft 66 as shown in FIG. 4. The speed of the shaft 56 may thus be adjusted in relation to the speed of the pump shaft 66. A rotatable speed adjusting knob 118 is shown for this purpose in FIGS. 1 and 4. The knob is screw threadedly connected with a vertically movable shaft 120 having an arm 122 to regulate the distance between the two sides of the variable diameter pulley 60, the pulley 62 being reversely varied by the tension of the belt 64 as opposed by a spring 124 shown in FIG. 5. The pump shaft has a pulley 68 thereon driven by a belt 70 from a pulley 72 on a motor shaft 74 of a motor M.

To the right of the gear housing 54 is a linking device comprising a pair of chains 76 provided with casing guide lugs 78, shown as one on each link of the chain except at three points on each chain where a crimping lug 80 is provided as shown in FIGS. 8 and 9. The guide lugs 78 are provided with notches 78a while the lugs 80 are provided with notches 80a, the relative depths of which are illustrated at the right and left ends of FIG. 9, and the purpose of which will hereinafter appear. The chains 76 extend around sprockets 82 and are back-supported by plates 77. The left hand sprockets in FIGS. 1, 4, 5 and 8 are mounted on vertical shafts 84 extending from the gear housing 58 and driven by suitable gearing therein.

At the right hand end of the machine a link looper is shown comprising a pair of discs 86 and 88 and a helical rod 90. The disc 86 as shown in FIG. 5 is journaled in a housing 92 and carries a gear 94 with which a gear 96 meshes (see FIG. 1). The gear 96 is on a vertical shaft 98 which is driven by a chain 100 from gearing in the housing 58, the gearing being designed so as to provide the correct relative speeds of the casing chuck 48, the linking chains 76 and the link looper 86—88—90.

Referring to FIG. 19, the stuffer tube 26 has been modified by the use of a rod 29 terminating in a head 31. The rod is secured at one end to the side of the tube so that the major portion thereof is centered with respect to the tube, and the head 31 is formed for smoothly guiding meat mixture laterally against the casing 108 within the chuck, thus tending to prevent undesirable collapse of the casing. The flutes 50, since they restrict the casing, cause it to be weakened within the casing chuck, and the arrangement just described serves to resist such tendency. At the same time, the passageway for the meat mixture between the discharge end of the tube and the head 31 is free of obstruction to avoid meat fibers catching on any part of the tube and interfering with free flow of the meat. Another form of stuffer tube 26a is shown in FIG. 20 which has a closed end 27 and lateral discharge perforations 29a. The perforations 29 are in the most restricted zone of the flutes 50 where the casing 108 is gripped for rotation. The forces of the meat mixture issuing from the perforations tends to positively hold the casing out against the flutes of the chuck. Any tendency for the casing to collapse is automatically resisted by a rise in pressure since the casing in that event would tend to close off the discharge perforations. This modified form of construction accordingly tends to prevent undesirable collapse of the casing 108 at its weakest point (in the casing chuck) when the crimping lugs 80 of the linking device engage the casing.

The further modification of FIG. 21 illustrates a stuffer tube 26b having side perforations 33, but instead of the closed end of FIG. 20, the end is open as shown at 35. This avoids any possibility of meat fibers catching as they might on a closed-end tube.

In the modified construtcion of linking mechanism shown in FIGS. 22, 23 and 24 the casing guide lugs 78 are provided as in FIG. 8, but instead of the crimping lugs 80 the chains 76 are provided with holding lugs 126 having holding flutes 128 as shown in FIG. 24.

Having described briefly the structure of my encasing machine I will now describe the operation and purposes of various components thereof. Briefly the purpose of the machine is to load the empty meat mixture receiving casing 108 with product such as sausage, frankfurter ingredients, cereal or the like, in plastic condition or as an emulsion, so that it can be pumped into the casing, fill the casing with a high degree of accuracy, link the casing into links of substantially equal and accurate weight, and loop the linked strand of casing on a smoke stick 102 shown in FIGS. 2, 11 and 12 for further processing. Automatic operation is desirable such as the pressing of a "start" button 104 shown on a control panel 106 in FIGS. 1 and 4 after the casing 108 (usually of cellulose acetate in the form of a tube folded bellows-like) is placed in the machine, whereupon the filling of the casing and the linking and looping thereof automatically proceed until the casing has been completely filled. The machine then automatically stops itself. Thus one operator may operate more than one machine.

Heretofore these casings have been filled manually by slipping the folded casing on a stuffer tube (similar to the tube 26) from which the meat mixture or emulsion was extruded under high pressure (approximately 100 p.s.i.). The operator controlled the filling by applying pressure with his hand to retard unfolding and movement of the folded casing off the end of the stuffer tube. Uniform filling was dependent on the skill of the operator and variations in diameter and thus weight per unit length of casing was the rule rather than the exception. These casings come folded as illustrated in FIGS. 5 and 6 with approximately 55 feet of the casing condensed into a length of 12 to 13 inches. The 55 foot length of filled casing was projected onto a table, after which a linking machine produced links of uniform length, but if the diameter varied the weight likewise varied. In controlling the casing as it leaves the stuffer tube an increase of hand pressure retards the movement of the casing and since the pumping rate of the meat is uniform the diameter increased and vice versa. Thus it was difficult to finally package a certain number of links and have all the packages weigh the same.

On the other hand my machine is designed so as to obtain accuracy of pressure on the casing by means of the casing chuck 48 which holds it to a uniform diameter, the casing follower 34 under substantially uniformly constant pressure and the speed of operation of the linking mechanism 76—78—80, all of which cooperate with the pump 16 metering the flow of product so that the casing is held to a uniform diameter and linked at uniform intervals whereby uniform weight per unit of length results.

As shown in FIG. 2 the general procedure includes extrusion of the meat mixture by operation of the pump 16, the extrusion pressure being approximately 100 p.s.i. The meat mixture conduit 18 receives meat or other product from a "meat supply" as indicated, preferably at some lower pressure such as 25 p.s.i. in order to properly feed the pump 16 whereupon the pump, in addition to merely pumping the meat mixture, serves as a metering means therefor. This pump may be of the gear type or any other suitable type that produces accurate metering.

The folded casing 108 is shown threaded over the stuffer tube 26 and part of it has already been linked (110) and looped after passing through the rotating casing chuck 48. The notches 78a of the guide lugs 78 of the chains 76 provide a tubular passageway having a circumference slightly larger than the casing 108 and travel at the same speed as the links 110 since they are part of a chain system 76 that also carries the crimping lugs 80. Periodically the notches 80a of the crimping lugs engage the casing 108 and squeeze down the diameter thereof at this point which prevents rotation of the filled casing to the right of the engaging crimping lugs. Accordingly the continued rotation of the casing chuck 48 twists a restriction 112 in the casing, thus producing the separate links 110 as shown in FIGS. 2 and 8.

The links 110 pass through the disc 86 of the link looper and after several links have looped downwardly between this disc and the disc 88, a notch 114 in the disc 88 engages the links and, in coperation with the spiral helical rod 90, throws another loop of the links over the smoke rod 102. In FIG. 2 only a few links are shown in each loop but ordinarily about a dozen are present in each loop, and several loops accumulate on the smoke stick 102 before the casing is completely filled and linked. The smoke stick may be merely thrust into an opening 116 of the disc 88 and remain thereby gravity during the linking operation. After all the loops of links are accumulated thereon the smoke stick may be removed and transferred to a suitable racking frame for further processing such as cooking and/or smoking.

Describing the operation more in detail, the casing clamp 36—38 is open as shown diagrammatically in FIG. 13 so that a folded casing may be laid thereon as in FIG. 5 between the casing follower 34 and the casing chuck 48 while the stuffer tube 26 is retracted as in FIG. 1. FIG. 13 illustrates the starting position of the parts. The operator now presses the start button 104 which results in operation of a solenoid valve SV1 for admitting air to the upper end of the cylinder C1 to close the V-seat 38 in relation to the V-seat 36 (FIG. 14). The folded casing 108 is thus clamped between the seats 36 and 38 and held thereby in alignment with the stuffer tube 26. The seats straighten the casing and center it in line with the stuffer tube. These folded casings are invariably bent and crooked and must be straightened so that the hole through the center is straight in order to properly receive the stuffer tube.

Closure of the casing clamp actuates a limit switch LS1 as shown in FIG. 14 which operates a solenoid valve SV2 for supplying air to the cylinder C2 for moving the stuffer tube 26 toward the right. During such movement the stuffer tube enters the folded casing 108 and passes therethrough and into the casing chuck 48 shown in FIGS. 5 and 6. When in this position the ports 28 are within the outer housing 22 of the pump 16 and therefore in communication with the pump to receive the meat mixture therefrom.

At the completion of this forward motion a limit switch LS2 is contacted as in FIG. 15 which results in the solenoid valve SV1 reversing air flow in the cylinder C1 to open the clamp 36—38.

In FIG. 16 the clamp has opened which causes limit switch LS3 to operate solenoid valve SV3 so that air is sent to the left hand end of the cylinder C3 thus moving the casing follower 34 into engagement with the left hand end of the casing and under a substantially constant pressure. The limit switch LS3 also actuates a solenoid valve SV4 to open the meat mixture valve 20 by sending air to the outer end of a cylinder C4, and actuates a motor switch MS for energizing the motor M. The pump 16, the casing chuck 48, the linking chains 76 and the link looper 86—88—90 are all now in operation.

Accordingly the casing filling, linking and looping operations proceed as hereinbefore described until the casing 108 has been completely filled and linked whereupon the casing follower 34 will have advanced as shown in FIG. 17 to a position for actuating a limit switch LS4. The limit switch LS4 and the solenoid valve SV3 reverses the travel of the casing follower 34 by sending air to the other end of the cylinder C3, closes the valve 20 by causing the solenoid valve SV4 to send air to the inner end of the cylinder C4 (thus preventing any dribbling) and actuates the switch MS to de-energize the motor M.

When the casing follower 34 reaches its fully retracted position, limit switch LS5 as shown in FIG. 18 actuates the solenoid valve SV2 to reverse the travel of the stuffer rod 26. All parts are now in position for another operation after a fresh casing 108 is laid in the clamp seat 36 and the start button 104 again depressed.

FIGS. 16a and 17a show a modification in which the solenoid valve SV4, the cylinder C4, the meat valve 20 and the motor switch MS are replaced by a clutch CL operated by a solenoid S. When LS3 is actuated by upward movement of the V-seat 38 as in FIG. 16 the solenoid activates the clutch CL as in FIG. 16a, and when LS4 is actuated as in FIG. 17 the solenoid deactivates the clutch. The stuffer tube 26 and its ports 28 act as a meat mixture valve by movement of the ports out of the outlet housing 22 soon after the tube starts retracting as in FIG. 18, and seals off the meat mixture from contact with air which is one of the purposes of a meat mixture valve. At the same time the parts of the stuffing apparatus are kept fully charged with the product and dribbling is eliminated by deactivation of the clutch CL interposed between the motor shaft 74 and the pulley 72 that drives the pump and other operative elements of the machine.

In the linking operation the flutes 50 of the casing chuck 48 depress portions of the casing 108 as shown in FIG. 7, and are tapered as shown in FIG. 6 to readily receive the filled casing and accomplish such depression to the extent necessary for rotating the entire folded casing about the stuffer tube 26 and produce the desired linking action. The casing is forced through the casing chuck by the pressure of the meat mixture as it issues from the stuffer tube 26.

After leaving the casing chuck the casing is guided and supported by the lugs 78 of the chain 76 which keeps the filled casing from collapsing or deviating from a straight path. The crimping lugs 80 are arranged in mating pairs and spaced the length of the link desired. These lugs progressively pinch down on the filled casing as it is moved along by being filled from the pump 16 (the speed of the chains 76 being synchronized with that of the casing as it comes from the stuffer tube) thus reducing the casing diameter at the link ends. When the casing is pinched down to a small dimension as indicated at 112 it loses strength so it is no longer able to rotate the portion of the casing on the down-stream side of the crimping lugs. The preceding link 110 thereupon stops rotating and is a finished link.

The rotary speed of the casing chuck is determined by the number of twists desired between successive links. Usually two twists is sufficient. Therefore the casing chuck is geared to make two revolutions while the linking chains advance the distance between crimping lugs or the length of lone link. The product leaving the chains is a filled linked non-revolving strand of links. Since the strand is not revolving it can be readily controlled and automatically linked by the relatively simple linking means disclosed.

Since the meat mixture pump 16 operates at a uniform fixed speed it is obvious that the output volume of the meat mixture is uniform. Also since the linking chains are positively driven at a predetermined relative speed from the pump it is also obvious that each link will have the same quantity of meat mixture and the links will be of equal weight. By use of the variable speed drive 60—62—64 the operator is able to adjust the amount of meat mixture in each link. For example, should more meat mixture be required, he slows down the linking chains relative to the pump. Since the length of each link is fixed by the spacing of the crimping lugs 80 this will increase the diameter of each link and accordingly its weight.

The casing chuck 48 is an important feature of my machine. The several tapered flutes 50 may be varied in number and shape to fit different conditions. The folded casing is lightly forced against the long taper of the flutes by the casing follower 34 which accomplishes engagement of the casing with the flutes thus furnishing the rotating force to turn the folded or bellows-like casing 108 on the stationary stuffing tube 26, and propels the folded casing axially yet allows the folds to unfold as the casing is filled. The casing 108 (which is pliable and somewhat elastic when damp from the product encased in it) bulges between the flutes 50 just after leaving the tube 26 and before reaching the position illustrated in FIG. 7, and this bulging produces uniform resistance to movement of the filled casing through the chuck 48. As the casing is filled it assumes the cross sectional shape shown and is somewhat keyed or splined into the casing chuck. This shape of flute allows smooth flow of product through the chuck and eliminates casing shapes that allow collapse that result in links of random length. The bulging shape given to the filled casing tends to frictionally hold the casing within the chuck as necessary to keep it from being moved through the chuck too easily. The constriction afforded by the flutes furnishes a light drag to the filled casing, and the number of flutes in the chuck may be varied to vary this drag. This action also tends to avoid stopping the casing in its continuous movement through the machine.

When the casing chuck 48 of FIGS. 19 and 20 are used in conjunction with the stuffer tube 26, the rod 29 and the head 31, or in conjunction with the stuffer tube 26a respectively, the meat is discharged directly toward the wall of the casing 108 and thus tends to prevent its collapse, and the undesirable possibility of a link being started in the restriction caused by the flutes of the casing chuck by its rotation and by the crimping lugs 80 engaging the casing and thus tending to stop its rotation is averted.

The type of linking mechanism shown in FIGS. 22, 23 and 24 results in the holding lugs 126 engaging the casing 108 near the down-stream end of a link about to be formed, the chains 76 being spaced rather from the chuck 48 than in the form of linking mechanism shown in FIG. 8. The flutes 128 of the holding lugs 126 grip the filled casing 108 as shown in FIG. 24 thus stopping the rotation of the link about to be formed. When this link progresses a little further than FIG. 22, as shown in FIG. 23, the continued rotation of the chuck 48 will twist the casing at its weakest point indicated at 112a which is within the restriction of the chuck. Thus the new link is formed at this point instead of relying on crimping lugs of the linking chains for this purpose.

This tube is retractable endwise to allow the folded casing to be manually laid in place in the V-seat 36 in front of the chuck, and the stuffer tube is then automatically advanced through the folded casing upon initiating operation of the machine by depressing the start button 104. The operating cycle then proceeds as described and is self-terminating.

The design of my encasing machine is such that it is capable of high speed operation without fracture of the casing 108. Referring to FIG. 8 it will be noted that the casing guide lugs 78, as they swing around the left hand sprocket 82, pass relatively close to the casing chuck 48. The V-notches 80a of the crimping lugs 80 pass even closer so that when they initially engage the filled casing, the point of engagement is quite close to the point of filling which is somewhat of an open end as shown in FIG. 6 extending back toward the left inside the flutes 50 and surrounding the discharge end of the stuffer tube 26. This relieves the additional pressure caused by crimping the casing so that the casing does not burst even though being filled, crimped and linked at high speed. Furthermore the crimping lugs 80 in swinging around the sprockets 82 attain a greater speed than the portions of the chains 76 traveling between the sprockets and therefore tend to impart additional pull to the casing in the area between the downstream end of the casing chuck 48 and where the crimping lugs engage the filled casing, thus further reducing the pressure for minimizing the possibility of casing breakage or fracture. Rather than being laterally at right angles across the chains 76 for crimping lugs 80 are at an angle as shown in FIG. 8 and the angles of the interlocking lugs so cross each other that the restriction 112 to form the link results from the crimping lugs pinching into the casing at the same angle as the natural folds of the casing as it starts to twist due to rotation in the direction of the arrow 49 on the chuck 48 in this figure. This also contributes to minimization of the possibility of casing breakage and all of the features mentioned in this paragraph make it possible to operate my machine at much higher speeds than heretofore attained in the prior art.

From the foregoing description it will be obvious that I have provided a machine which is substantially continuous in operation, requiring only periodic stoppage for insertion of folded casings. It accordingly operates with a high rate of production due also to the automatic linking of the filled casing as it progresses through the linking chains in a continuous manner. The construction and operation is such that the portions of the casing between links are always twisted in the same direction thus avoiding the possibility of unwinding.

Obviously the operation of the casing chuck, linking chains and link looper may be constant, and the pump speed varied to adjust for accuracy of weight per link which is the reverse of the arrangement disclosed. The important consideration is relative speed, and the speed adjusting knob 118 may be thus used to nicely control the weight in each link so that a specified number of links may equal one pound or other desirable unit.

Some changes may be made in the construction and arrangement of the parts of my machine for encasing sausage and the like without departing from the real spirit and purpose of my invention. Therefore it is my intention to cover by my claims any modified forms of structure or use of mechanical equivalents which may reasonably be included within their scope, and wherein the material being encased has been broadly referred to as "product."

I claim as my invention:

1. In a product encasing machine, means for supporting a folded casing, a stuffer tube adapted to enter the casing when so supported, means for forcing product through said stuffer tube and into the casing, said last means including a housing, said stuffer tube being mounted for longitudinal sliding through said housing and into the casing while supported by said first means, said stuffer tube having a product receiving port cooperable with said housing to receive product therefrom only when said stuffer tube is positioned in the casing, a casing chuck rotatably mounted to receive the filled casing from the discharge end of said stuffer tube and comprising a collar-like element through which the filled casing is forced, and linking means at the discharge end of said casing chuck having means to grip a portion of the casing to form links of the filled casing and hold the links against rotation by said casing chuck whereby rotation of said chuck twists the casing at one of said gripped portions and always in the same direction.

2. In a product encasing machine, means adapted to support a folded casing, a stuffer tube movable longitudinally thereinto while so supported, pump means for forcing product through said stuffer tube and into the casing, a casing chuck mounted to receive the filled casing from the discharge end of said stuffer tube and comprising a collar-like element through which the filled casing is forced, said collar-like element having frictional engaging means to grip the casing, linking means beyond the discharge end of said casing chuck to form links of the filled casing, said collar-like element and said linking means being relatively rotatable to twist the casing between said links in order to clearly define such links, power means to effect such relative rotation and to operate said pump means, and means for changing the speed ratio between such relative rotation and said pump means to vary the amount of product per link.

3. In a product encasing machine, a pair of elongated opposite seats adapted to have a folded casing positioned therebetween, means for closing said seats for aligning the casing when received therein, a stuffer tube mounted for longitudinal movement into the casing when in said seats, means for thereupon opening said seats to permit rotation of the casing on said stuffer tube, means for forcing product through said stuffer tube and into the casing, a casing chuck rotatably mounted to receive the filled casing from the discharge end of said stuffer tube, and having means to restrict the diameter of the casing and effect rotation thereof, and linking means for the filled casing issuing from said casing chuck, said linking means having gripping means to periodically grip the casing and also restrict the diameter thereof, and operable to stop rotation thereof whereupon the casing is twisted at one of the restricted diameters thereof to start the next successive link in the casing.

4. In a product encasing machine of the character disclosed, means for supporting a folded casing, a stuffer tube movable endwise into the casing when so supported, means for pumping plastic product into said stuffer tube only when in the casing and from said stuffer tube into the casing, a casing chuck rotatably mounted and having means to restrict the diameter of the casing and effect rotation thereof, linking means for the filled casing issuing from said casing chuck, power means, and an operative connection from said power means to said pumping means, said casing chuck and said linking means, said operative connection including means to relatively adjust the speed of said pumping means and said linking means, said linking means having gripping means to grip the casing at longitudinally spaced positions therealong and stop rotation thereof whereupon the casing is twisted at the restricted diameter thereof to start the next successive link in the casing.

5. In a product encasing machine of the character disclosed, a stuffer tube adapted to have a folded casing positioned thereon, means for pumping plastic product into said stuffer tube and from said stuffer tube into the casing, a chuck mounted to receive the filled casing from the discharge end of said stuffer tube and having means to frictionally engage a portion of the casing, linking means for the filled casing issuing from said casing chuck, one of said two last mentioned means serving to engage the filled casing, displace said plastic product and reduce the cross sectional dimension of the filled casing at a position along the length of the casing to form the beginning of a new link adjacent said position, said chuck and said linking means cooperating during operation thereof to form such link, and a looper for the links as they issue from said linking means comprising guide means for the linked casing as it issues from said linking means, said guide means being rotatable on a horizontal axis and operable to separate the linked casing into loops of predetermined length and support them in depending position from said guide means.

6. In a product encasing machine of the character disclosed, a stuffer tube adapted to have a folded casing positioned thereon, means for pumping plastic product into said stuffer tube and from said stuffer tube into the casing, a chuck mounted to receive the filled casing from the discharge end of said stuffer tube and having means to frictionally engage a portion of the casing, linking means for the filled casing issuing from said casing chuck, one of said two last mentioned means serving to engage the filled casing, displace said plastic product and reduce the cross sectional dimension of the filled casing at a position along the length of the casing to form the beginning of a new link adjacent said position, said chuck and said linking means cooperating during operation thereof to form such link, and a looper for the links as they issue from said linking means comprising a pair of rotating discs, one having a central opening receiving the links and the other one spaced from the first one, a helical rod extending from one disc to the other, said other disc having a notch for periodically engaging the links and looping them.

7. In a product encasing machine of the character disclosed, a stuffer tube adapted to have a folded casing positioned thereon, means for pumping plastic product into said stuffer tube and from said stuffer tube into the casing, a chuck mounted to receive the filled casing from the discharge end of said stuffer tube and having means to frictionally engage a portion of the casing, linking means for the filled casing issuing from said casing chuck, one of said two last mentioned means serving to engage the filled casing, displace said plastic product and reduce the cross sectional dimension of the filled casing at a position along the length of the casing to form the beginning of a new link adjacent said position, said chuck and said linking means cooperating during operation thereof to form such link, and a looper for the links as they issue from said linking means comprising a pair of rotating discs, the first one having a central opening receiving the links and the second one being spaced from the first one, a helical rod extending from one disc to the other, said other disc having an opening to receive a supporting stick for the loops and a notch for engaging the links and looping them and depositing them in loops on said stick.

8. A product encasing machine comprising means for stuffing and linking a casing, and means for looping the stuffed and linked casing comprising a pair of rotating discs, one having a central opening receiving the links and the other one spaced from the first one, a helical rod extending from one disc to the other, said other disc having a notch for periodically engaging the links and looping them.

9. A product encasing machine comprising means for stuffing and linking a casing, and means for looping the stuffed and linked casing comprising a pair of rotating discs, the first one having a central opening receiving the links and the second one being spaced from the first one, a helical rod extending from one disc to the other, said other disc having an opening to receive a supporting stick for the loops and a notch for engaging the links and looping them and depositing them in loops on said stick.

10. In a product encasing machine of the character disclosed, a stuffer tube adapted to have a folded casing positioned thereon, means for pumping plastic product into said stuffer tube and from said stuffer tube into the casing, a casing chuck rotatably mounted to receive the filled casing from the discharge end of said stuffer tube and having means to grip a portion of the casing and rotate the same, linking means for the filled casing issuing from said casing chuck, said linking means having gripping means for periodic gripping of a portion of the casing and operable to stop its rotation, and cooperating with said casing chuck in forming the beginning of a new link at one of said gripped portions of the casing, said gripping means of said linking means being movable with the filled casing issuing from said casing chuck, and means for changing the ratio of such movement relative to the speed of operation of said pumping means.

11. In a product encasing machine of the character disclosed, a stuffer tube adapted to be positioned in a folded casing, clamp means for the casing, means for closing said clamp means to position the casing for the reception of said stuffer tube therein, means for moving said stuffer tube into the positioned casing, means for opening said clamp means, means for forcing plastic product into said stuffer tube and from said stuffer tube into the casing, a casing follower movable along said stuffer tube, a casing chuck rotatably mounted to receive the filled casing from the discharge end of said stuffer tube and having means to frictionally engage the casing and rotate the same, linking means beyond the discharge end of said casing chuck having crimping means engageable with the casing to restrict its diameter at spaced positions therealong whereupon the rotation of said casing chuck twists the casing at such positions, thus providing successive links in the filled casing, and means for retracting said stuffer tube to permit said clamp means to receive another casing.

12. In a product encasing machine of the character disclosed, a stuffer tube adapted to be positioned in a folded casing, clamp means for the casing, means for closing said clamp means to position the casing for the reception of said stuffer tube therein, means for moving said stuffer tube into the positioned casing, means for opening said clamp means, means for forcing plastic product into said stuffer tube and from said stuffer tube into the casing, a casing chuck rotatably mounted to receive the filled casing from the discharge end of said stuffer tube and having means to frictionally engage the casing and rotate the same, a casing follower movable along said stuffer tube, said casing follower being biased to force the casing toward said casing chuck, linking means beyond the discharge end of said casing chuck having crimping means engageable with the casing to restrict its diameter at spaced positions therealong whereupon the rotation of said casing chuck twists the casing at such positions, thus providing successive links in the filled casing, and means for retracting said casing follower and said stuffer tube to permit said clamp means to receive another casing.

13. In a product encasing machine of the character disclosed, a stuffer tube adapted to have a folded casing positioned thereon, said stuffer tube having a discharge end, means for forcing plastic product into said stuffer tube and from said discharge end into the casing, a casing follower movable along said stuffer tube, a casing chuck rotatably mounted to receive the filled casing from said discharge end of said stuffer tube and having means to frictionally engage the casing and rotate the same, linking means beyond the discharge end of said casing chuck having crimping means engageable with the casing to restrict its diameter at spaced positions therealong whereupon the rotation of said casing chuck twists the casing at the restrictions thereof, thus providing successive links in the filled casing, clamp means for the casing, said clamp means when open permitting the reception of a folded casing therein, means for closing said clamp means, said clamp means when closed effecting movement of said stuffer tube into the folded casing, means thereupon operable to open said clamp means and actuate said casing follower, and means operable after said follower has followed the rear end of the casing to said casing chuck for returning said stuffer tube and said casing follower to retracted position for the next casing.

14. In a product encasing machine of the character disclosed, a stuffer tube adapted to have a folded casing positioned thereon, means for pumping plastic product into said stuffer tube and from said stuffer tube into the casing, a chuck mounted to receive the filled casing from the discharge end of said stuffer tube and having means to frictionally engage a portion of the casing, linking means for the filled casing issuing from said casing chuck, one of said two last mentioned means serving to engage the filled casing, displace said plastic product and reduce the cross sectional dimension of the filled casing at a position along the length of the casing to form the beginning of a new link adjacent said position, said chuck and said linking means cooperating during operation thereof to form such link, and a looper for the links as they issue from said linking means, said product encasing machine having clamp means for the casing, said clamp means when open permitting the reception of a folded casing therein, means for closing said clamp means, said clamp means when closed effecting movement of said stuffer tube into said folded casing, means thereupon operable to open said clamp means and operate said pumping means, said casing chuck, said linking means and said looper, and means operable after the casing has been completely filled and linked for returning said stuffer tube to retracted position, and stopping the operation of said pumping means, said casing chuck, said linking means and said looper whereby the stuffer tube is in position for the reception of another casing in said clamp means.

15. In a product encasing machine of the character disclosed, a stuffer tube adapted to have a folded casing positioned thereon, means for pumping plastic product into said stuffer tube and from said stuffer tube into the casing, a casing chuck rotatably mounted to receive the filled casing from the discharge end of said stuffer tube and having means to grip a portion of the casing and rotate the same, and linking means for the filled casing issuing from said casing chuck, said linking means having gripping means for periodic gripping of a portion of the casing and operable to stop its rotation, and cooperating with said casing chuck in forming the beginning of a new link at one of said gripped portions of the casing, said product encasing machine having clamp means for the casing, said clamp means when open permitting the reception of a folded casing therein, means for closing said clamp means, said clamp means when closed effecting movement of said stuffer tube into the folded casing, and means thereafter operable to effect opening of said clamp means, operation of said pumping means, rotation of said fasing chuck and operation of said linking means to fill the casing and link it, and for returning said stuffer tube to retracted position, stopping the rotation of said casing chuck, stopping operation of said linking means and stopping the pumping of plastic product into said stuffer tube after the casing has been completely filled and linked.

16. In a product encasing machine of the character disclosed, a stuffer tube adapted to have a folded casing positioned thereon, means for pumping plastic product into said stuffer tube and from said stuffer tube into the casing, a casing chuck rotatably mounted to receive the filled casing from the discharge end of said stuffer tube and having means to grip a portion of the casing and rotate the same, and linking means for the filled casing issuing from said casing chuck, said linking means having gripping means for periodic gripping of a portion of the casing and operable to stop its rotation, and cooperating with said casing chuck in forming the beginning of a new link at one of said gripped portions of the casing, said product encasing machine having clamp means for the casing, said clamp means when open permitting the reception of a folded casing therein, a follower for the casing, means for closing said clamp means, said clamp means when closed effecting movement of said stuffer tube into the folded casing and movement of said follower to push the casing along said stuffer tube toward said casing chuck, means thereupon operable to open said clamp means, operate said pumping means to fill the casing and operate said linking means to effect the linking operation, and means operable after the casing has been completely filled and linked for returning said stuffer tube and said casing follower to retracted position, and stopping the operation of said pumping means.

17. In a product encasing machine of the character disclosed, a stuffer tube adapted to have a folded casing positioned thereon, means for pumping plastic product into said stuffer tube and from said stuffer tube into the casing, a casing chuck rotatably mounted to receive the filled casing from the discharge end of said stuffer tube and having means to grip a portion of the casing and rotate the same, and linking means for the filled casing issuing from said casing chuck, said linking means having gripping means for periodic gripping of a portion of the casing and operable to stop its rotation, and cooperating with said casing chuck in forming the beginning of a new link at one of said gripped portions of the casing, said product encasing machine having clamp means for the casing, means to open said clamp means to permit the reception of a folded casing therein, means for closing said clamp means, means responsive to said clamp closing for effecting movement of said stuffer tube into the folded casing, means responsive to said stuffer tube when completely in the casing to open said clamp means, fill and link the casing, and thereafter return said stuffer tube to retracted position for the reception of another casing in said clamp means.

18. In a product encasing machine of the character disclosed, a stuffer tube adapted to have a folded casing positioned thereon, means for pumping plastic product into said stuffer tube and from said stuffer tube into the casing, a casing chuck rotatably mounted to receive the filled casing from the discharge end of said stuffer tube and having means to grip a portion of the casing and rotate the same, and linking means for the filled casing issuing from said casing chuck, said linking means having gripping means for periodic gripping of a portion of the casing and operable to stop its rotation, and cooperating with said casing chuck in forming the beginning of a new link at one of said gripped portions of the casing, said product encasing machine having openable clamp means for the casing, said clamp means when open permitting the insertion of a folded casing therein, a casing follower movable along said stuffer tube, means for closing said clamp means and thereupon effecting movement of said stuffer tube through the folded casing, means thereupon operable to open said clamp means, and fill and link the casing, and means operable after such filling and linking for returning said stuffer tube and said casing follower to retracted postion.

19. In a product encasing machine of the character disclosed, a stuffer tube adapted to have a folded casing positioned thereon, metering means for pumping plastic product into said stuffer tube and from said stuffer tube into the casing, linking means for the casing after it is filled by said stuffer tube, and means for changing the ratio of the speed of operation of said linking means relative to the speed of operation of said metering means to thereby change the weight of product contained in each link formed by said linking means.

References Cited in the file of this patent

UNITED STATES PATENTS

| | | |
|---|---|---|
| 1,245,652 | Wolke | Nov. 6, 1917 |
| 1,366,183 | Hottmann | Jan. 18, 1921 |
| 1,554,382 | Stallman | Sept. 22, 1925 |